United States Patent
Breedon

[11] Patent Number: 5,951,827
[45] Date of Patent: Sep. 14, 1999

[54] HIGH CAPACITY TRAYS

[75] Inventor: Donald K. Breedon, Stoke-on-Trent, United Kingdom

[73] Assignee: Norton Chemical Process Products Corporation, Stow, Ohio

[21] Appl. No.: 08/860,962

[22] PCT Filed: Feb. 20, 1996

[86] PCT No.: PCT/US96/02205

§ 371 Date: Jul. 15, 1997

§ 102(e) Date: Jul. 15, 1997

[87] PCT Pub. No.: WO96/26779

PCT Pub. Date: Sep. 6, 1996

[51] Int. Cl.⁶ .................................................. B01D 3/32
[52] U.S. Cl. ...................................... 202/158; 261/114.1
[58] Field of Search .............................. 202/158; 203/29, 203/DIG. 6; 261/114.1, 114.3, 114.4, 114.5

[56] References Cited

U.S. PATENT DOCUMENTS

| | | | |
|---|---|---|---|
| 3,693,948 | 9/1972 | Kloss | 261/114 |
| 4,192,835 | 3/1980 | Powers | 261/114 |
| 4,305,895 | 12/1981 | Heath et al. | 261/114 |
| 4,404,086 | 9/1983 | Oltrogge | 208/11 R |
| 4,504,426 | 3/1985 | Chuang et al. | 261/114 |
| 5,106,556 | 4/1992 | Binkley et al. | 261/114.1 |
| 5,213,719 | 5/1993 | Chuang | 261/114.1 |
| 5,277,847 | 1/1994 | Gentry et al. | 261/114.3 |
| 5,277,848 | 1/1994 | Binkley et al. | 261/114.1 |
| 5,453,222 | 9/1995 | Lee et al. | 261/114.1 |
| 5,478,507 | 12/1995 | Bros | 261/114.1 |
| 5,480,595 | 1/1996 | Yeoman et al. | 261/114.1 |
| 5,618,473 | 4/1997 | Sauter et al. | 261/114.1 |

FOREIGN PATENT DOCUMENTS

| | | |
|---|---|---|
| A 0266458 | 5/1998 | European Pat. Off. . |
| WO 95/29745 | 11/1995 | WIPO . |

*Primary Examiner*—Virginia Manoharan
*Attorney, Agent, or Firm*—David Bennett

[57] ABSTRACT

The provision of a fractionating column having fractionating trays designed to ensure that downflowing liquid exiting downcomers does not interfere with vapor passing up through perforations in the trays, ensures that weeping of the liquid through the perforations is avoided without need for an increase in vapor pressure.

4 Claims, 2 Drawing Sheets

LIQUID FLOW     VAPOR FLOW

LIQUID FLOW | VAPOR FLOW

HIGH CAPACITY TRAYS

BACKGROUND OF THE INVENTION

This invention relates to chemical process equipment in which a liquid is contacted with a counterflow of gas. This may be for a variety of purposes such as stripping a component from the liquid stream or absorbing a component into a liquid stream. More generically this invention relates to equipment designed to facilitate mass and/or heat transfer between phases.

The type of equipment to which this invention specifically relates employs cross-flow fractionation trays connected by downcomers. In such equipment a tower is provided with a plurality of fractionation trays arranged generally horizontally within the tower. Each tower has a perforated deck and at least one channel, called a downcomer, in which a liquid flowing over the deck may be collected and channeled to the tray below. In use a gas or vapor is introduced at the base of the tower and passes upwards through the perforations in the decks of the fractionation trays. Meanwhile a liquid is introduced at the top of the tower and percolates downward passing over the fractionation trays and down the downcomers to the tray below. Liquid exits the downcomers in a typical design either through an open bottom and/or the downcomer front area, (that is the side facing towards the center of the tray). The deck area available for perforation lies between the area below the downcomer from the tray above and the top of the downcomer to the tray below. This perforated area is known as the "bubbling area". The maximum vapor/liquid capacity of a tray increases with the increasing size of the bubbling area. One method of increasing the size of the bubbling area is to cut the downcomers short and perforate the area under the downcomer, (the "under-downflow area"). In such arrangements the liquid from the foreshortened downcomer discharges on to a perforated under-downflow area.

In some cases the downcomer may have a bottom pan where liquid flows around and out through slots in the bottom. The flow of liquid from the downcomer directly on to the perforations in the under-downflow area can be a problem however. In some designs there is provision for a raised perforated area under the downcomer with deflectors preventing direct contact between vapor and liquid, or a shelf over the perforated portion of the under-downcomer area.

The bubbling area of a tray can use a number of devices for passage of gas from below the tray for contact with the liquid flowing across the tray. These could be plain holes as in "sieve trays", or holes with variable orifice devices known as "valve trays", or gas chimneys fitted with inverted bell-shaped or rectangular caps known as "bubble cap trays".

According to an idealized process design, the liquid should be prevented from passing through the perforations in the decks of the fractionation trays by the pressure of gas passing through the perforations in the upward direction. This is a finely balanced process since, if the pressure is too great, the gas will have a shorter transit time within the tower and less efficient contact with the down-flowing liquid. The high gas velocity may also cause liquid droplets to be carried up to the tray above, thereby reducing the separation efficiency as a result of back-mixing. On the other hand if the gas flow rate is too low the liquid will penetrate through the perforations in the tray decks, (known as "weeping"), and short-circuit the flow patterns which are intended to maximize the extent and efficiency of liquid/gas contacts.

Thus, in summary, the gas flow should be slow enough to permit efficient contact with the liquid flow but fast enough to minimize weeping. While a pressure differential between the space above a fractionation tray and the space below is necessary, if this differential is too great gas flow will be accelerated as it passes through the perforations and the efficient bubbling contact will be lost.

Weeping is however often a problem when the liquid flow rate is particularly heavy in a local perforated area, and particularly in the under-downcomer area, and the present invention provides a fractionation tray design that ensures that the danger of weeping is minimized.

European Patent Application No. 0 266 458 discloses a tray construction in which valves similar to those on the main active area of the tray are placed beneath the under-downflow area.

In U.S. Pat. No. 5,106,556 the under-downflow area is provided with a raised platform with louvred vents through which the vapor can pass while being directed away from the under-downflow area.

It is an object of the present invention to provide a structure with a very high capacity in terms of throughput with very high efficiency from the viewpoint of the degree of separation that is attained.

The present invention provides a tray with maximized capacity by using the under-downcomer area as part of the bubbling area and selecting a novel device to prevent weeping of liquid through the tray to the tray below while maximizing opportunities for vapor liquid contact.

GENERAL DESCRIPTION OF THE INVENTION

The present invention provides a fractionating column comprising a first perforated fractionation tray with at least one downcomer for channeling an outflow from the first tray to a second perforated fractionation tray directly below the first in which each downcomer discharges liquid directly on to the outer surface of one or more elongated rectangular plenum zones oblique to the principle direction of flow, each comprising means permitting vapor flow from below into the plenum zone and perforation means by which the vapor may exit the plenum zone and into contact with the liquid flowing over the outside surface of the zone. Liquid is preferably discharged from the downcomers via radial slots, rectangular slots, castellated weirs or plain weirs specifically designed to direct the flow to an area where it can be evenly distributed before contacting the perforated area of the fractionation tray. In a preferred embodiment the downcomer discharges liquid on to the surface of one or more plenum zones each having the form of a bubble cap comprising a chimney riser surmounted by a slotted cap such that liquid flowing down over the cap surface contacts vapor entering the bubble cap through the riser and exiting the cap through generally vertical slots in the cap.

Thus, in a preferred embodiment, the flow from the downcomer portion of the second fractionation tray is directed on to a bubble-cap comprising a cap structure located above a valved perforation or a chimney shaped riser in the tray permitting passage of gas therethrough, said cap being provided with slots permitting exit of gas entering the cap in a generally horizontal direction. In use the liquid passing down the downcomer is discharged on to the top of the cap and thereafter flows to the deck of the fractionation tray past the slots in the cap. The slots may be graded in size to give optimum distribution of vapor into the liquid flowing down the the fractionation tray. This also has the effect of increasing the amount of contact between gas and liquid. The cap design may also be arranged to direct the flow of liquid predominantly towards the wall.

Where the shape of the downflow area permits it, many individual bubble caps may be used or alternatively the bubble cap can take the full shape of the under-downcomer area. The caps can have flat or rounded tops with no holes or slots therein. This reduces vertical momentum before it reaches the slots. The slots themselves are located in the walls of the caps and preferably positioned above the floor of the tray to initiate froth formation and promote even bubbling at an early stage. Where the downcomer is located adjacent the vessel wall, it is highly desirable to have slots located in the side of the bubble cap facing the wall so as to fully utilize as much as possible of the under-downcomer area for liquid/vapor contact. In place of the vertical slots, horizontal slots could be used. These slots can if desired be closed by louvres when no gas, (or gas at an insufficient pressure), is fed to the bubble cap.

The shape of the caps used in the structures of the invention is not critical but it is often preferred that the sides adjacent the vessel wall are inclined such that a larger flow passes in that direction onto the space between the cap and the vessel wall. Where the cap does not extend completely across the interior of the vessel, (for example in the manner of a chord where the vessel is cylindrical), it is often preferred to provide baffles in the shape of a slotted extension wall at both ends to ensure that any liquid flow directed towards the vessel wall continues on to the perforated fractionation tray in an orderly and relatively uniform fashion by being compelled to pass through the slots in the extension wall.

A chimney-shaped riser inside the slotted cap is a preferred feature since it provides a positive seal against flow of liquid through the bubble cap to the tray below.

The natural distribution effect of the bubble cap on the flow of liquid from the downcomer to the perforated portion of the tray can be further enhanced by the use of perforated or plain baffles. This is particularly desirable where the flow from the cap is predominantly towards the walls. In such a case it is advantageous to interpose a perforated barrier through which the liquid must pass to reach the conventionally perforated area of the tray. The barrier serves to make the flow spread more evenly.

The downcomers can be located peripherally, that is at the edges of the tray. Alternatively they can be situated away from the edge of the tray, (centrally located). The location is not important beyond the requirement that they do not discharge into a downcomer on the tray below since the objective is to maximize the vapor/liquid contacts through bubbling contact.

DETAILED DESCRIPTION OF THE INVENTION

The invention is now further described with reference to the Drawings which are intended to illustrate the invention but are not to be understood as implying any essential limitations on the scope of the invention.

Figure 1:
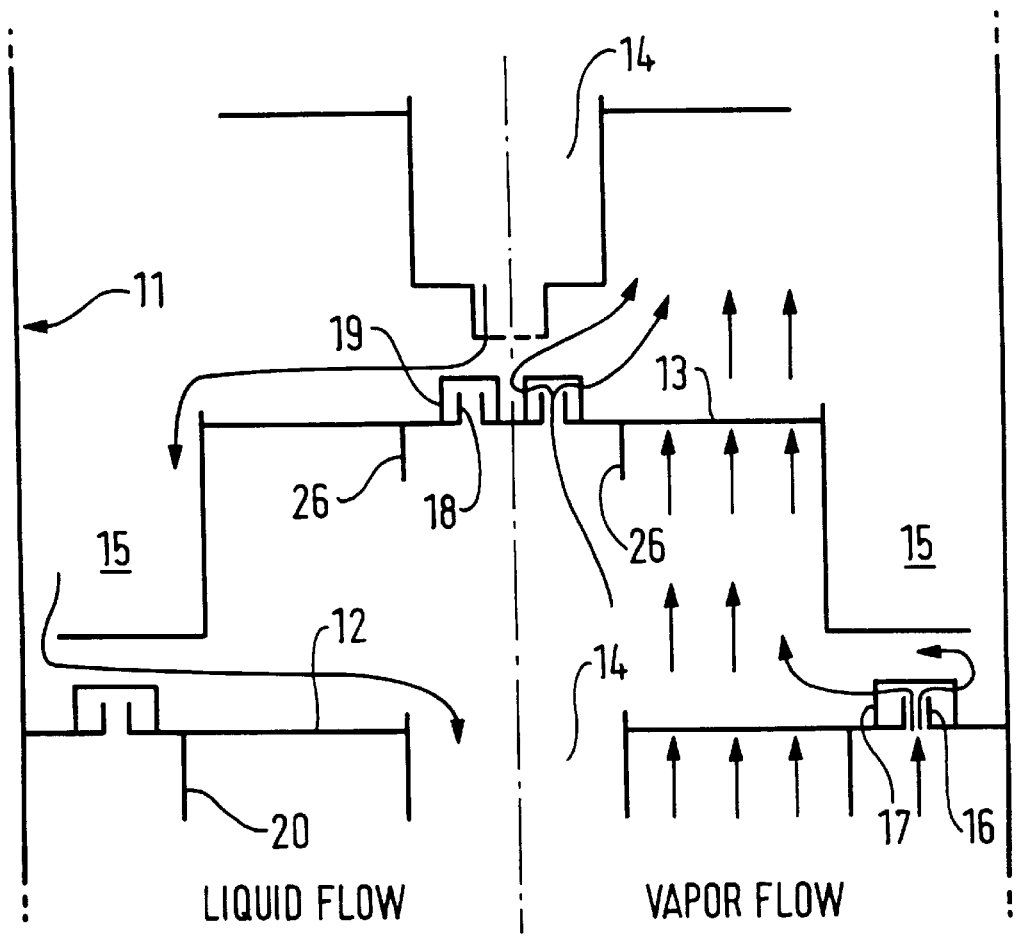
FIG. 1 is a schematic drawing showing a layout with a single center downcomer from a top tray with liquid release slots/perforations in the base, and two side downcomers from the middle tray showing liquid release between the downcomer base and the vessel wall. Bubble caps are shown in the under-downcomer area. Paths of vapor and liquid are shown.

In the embodiment illustrated schematically in FIG. 1, a vessel, 11, encloses a first kind of fractionation tray, 12, having a centrally located downcomer, 14, and a second type of fractionation tray, 13, having at least two downcomers, 15, located adjacent the wall of the vessel. The two types of tray alternate within the vessel such that a tray of the type exemplified by tray 12 has trays of type 13 above and below and vice versa. Tray, 12, has bubble caps comprising chimney-shaped risers, 16, surmounted by slotted caps, 17, located in the under-downcomer area below the peripherally located downcomers, 15, of the upper tray, 13. Tray, 13, has two centrally located bubble caps comprising risers, 18, similar to those in tray, 12, surmounted by slotted caps, 19, in the under-downcomer area below the centrally located downcomer, 14, in the tray above. The portions surrounding the bubble caps have downturned portions, 20 and 26, forming channeling structures leading vapor to the risers. A perforated barrier, 27, is located between the under-downcomer area and the perforated area of the tray.

The vapor flow pattern when the structure according to the invention is in use is shown on the right hand side and the liquid flow pattern is shown on the left hand side. The vapor passes through the perforations in the trays and through the slots in the bubble caps located in the under-downcomer areas. The liquid flows across the trays to the downcomers, contacting the vapor flowing upwards through the vessel as it goes, and enters the downcomers from which it is discharged on to the slotted bubble caps in the under-downcomer area. As the liquid flows across the surface of the caps it contacts vapor passing through the slots and is further spread across the tray in a uniform sheet that is of insufficient local volume to lead to weeping at the normal operating vapor flow rates used within the vessel.

Figure 2:
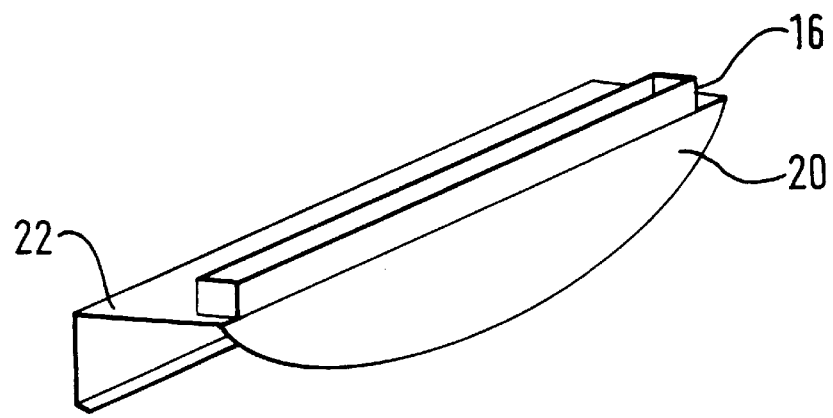
FIG. 2 is a perspective view of the riser portion of the bubble cap shown in FIG. 1 with the cap removed.
Figure 3:
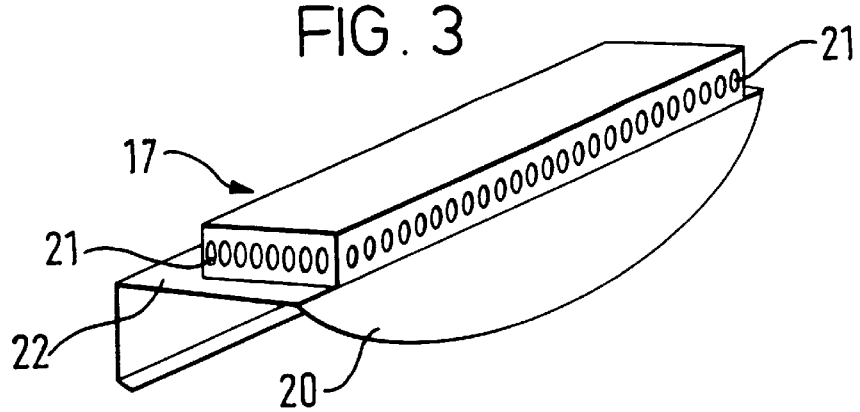
FIG. 3 shows a perspective view of the same device as is shown in FIG. 4 with the bubble cap in place.

FIGS. 2 and 3 illustrate the construction of the bubble caps when these are located in peripheral under-downcomer areas as in FIG. 1 with respect to tray, 12. They comprise a chimney-shaped riser, 16, and fitted over the riser and fixed to the tray, 12, a slotted cap, 17. FIG. 3 shows a plate, 22, designed to be fixed to the side of the vessel and provide the under-downcomer area, having a rectangular chimney-shaped riser, 16. The plate, 22, is otherwise unperforated. The part of the plate projecting within the vessel has a downward turned end portion, 20, to provide a passage up through which the vapor can pass on its way to the bubble cap without entraining substantial amounts of down-flowing liquid. The perforated fractionation tray is fixed to the plate to provide a continuous surface.

The riser is covered by a slotted cap, 17, which is fixed to the plate such that the only exit for vapor passing upwards through the bubble cap is through the slots, 21. The slots may be provided all round the cap so as to contact and distribute the liquid evenly in all directions. The slots themselves have a generally vertical long axis and terminate above the deck level.

Figure 4:
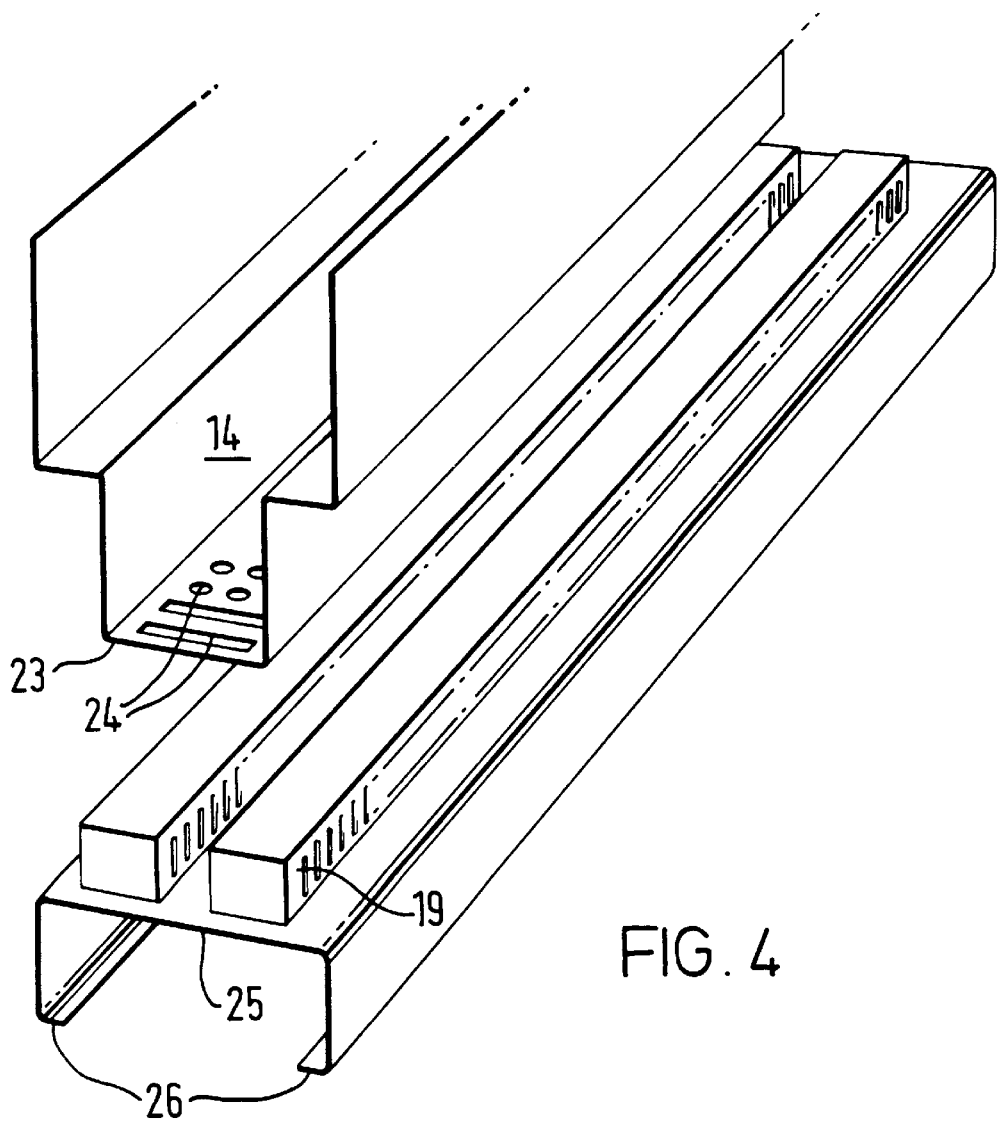
FIG. 4 is a partial perspective view of a downcomer arrangement according to the invention in which the downcomer is located in the center of the fractionation tray rather than at the periphery.

FIG. 4 shows a simplified perspective view of a downcomer/bubble cap arrangement that is located on a diameter of the vessel corresponding to the upper downcomer/bubble cap arrangement shown in FIG. 1. The downcomer, 14, has a bottom plate, 23, having a plurality of perforations, 24, to permit liquid to flow downward through the perforations to the under-downcomer portion of a fractionation tray directly below. The fractionation tray below, which is not shown for the sake of simplicity, has an unperforated under-downcomer area, 25, with downwardly turned margins, 26, projecting below the fractionation tray and providing a passage way through which upward flowing vapor can pass through risers, (not shown), to slotted caps, 19.

In use a vapor passes up through the bubble caps and the perforations in the fractionation tray to contact liquid flowing downwards through the perforations in the base of the downcomer and on to the bubble caps and thereafter across the perforated fractionation tray.

The above structure is very advantageous since it ensures that liquid flowing out from the downcomers does not channel towards perforations in the fractionation tray deck in such quantities as to prevent vapor flow through the perforations and cause weeping. Rather by ensuring that the flow first contacts non-perforated areas, (the tops of the bubble caps), and is spread evenly in the direction of all perforated areas, a uniformly high degree of liquid/vapor contact is maintained.

I claim:

1. A fractionating column comprising, within walls defining the interior of the column:

(a) first and second perforated fractionation trays with the second tray located directly below the first;

(b) at least one downcomer for channeling a liquid outflow from the first tray to the second;

(c) at least one elongated rectangular plenum zone located below each downcomer and extending substantially across the area below each such downcomer at an oblique angle to the principle direction of flow of a liquid from the lower end of the downcomer and across the second tray;

(d) vapor flow means permitting vapor from below the second tray to enter each plenum zone; and (e) a plurality of vertical slits by which vapor may exit each plenum zone in a generally horizontal direction and into contact with a liquid flowing over the outside surface of the plenum zone, the slits being located such that vapor flowing therethrough diverts liquid away from any space between a plenum and a column wall and directs liquid across the perforated surface of the second tray.

2. A fractionating column according to claim 1 which comprises a plurality of perforated fractionating trays located one above the other wherein at least one pair of first and second trays is provided with two or more downcomers by which a liquid flow may be channeled from the first tray to the second tray.

3. A fractionating column according to claim 1 which comprises a plurality of fractionating trays located one above the other wherein the trays alternate between having peripherally located downcomers and centrally located downcomers.

4. A fractionating column according to claim 1 in which a perforated barrier is located between the portion of each perforated tray below each downcomer occupied by the at least one elongated plenum zone and the perforated area of the tray such that the liquid must pass through the barrier to reach the perforated area of the tray.

* * * * *